US012794886B2

(12) United States Patent
Kumar

(10) Patent No.: US 12,794,886 B2
(45) Date of Patent: Nov. 10, 2026

(54) SYSTEMS AND METHODS FOR PROVIDING A UNIFIED APPLICATION PROGRAMMING INTERFACE PROXY SUPPORTING MULTIPLE ENDPOINTS FOR MULTIPLE USERS

(71) Applicant: Verizon Patent and Licensing Inc., Basking Ridge, NJ (US)

(72) Inventor: Sanjay Kumar, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 423 days.

(21) Appl. No.: 18/506,587

(22) Filed: Nov. 10, 2023

(65) Prior Publication Data

US 2025/0158987 A1 May 15, 2025

(51) Int. Cl.
*G06F 21/00* (2013.01)
*G06F 9/54* (2006.01)
*H04L 9/40* (2022.01)

(52) U.S. Cl.
CPC .......... *H04L 63/0884* (2013.01); *G06F 9/547* (2013.01); *H04L 63/083* (2013.01)

(58) Field of Classification Search
CPC ... H04L 63/0884; H04L 63/083; G06F 9/547; G06F 9/541
See application file for complete search history.

(56) References Cited

U.S. PATENT DOCUMENTS 9,531,801 B1 * 12/2016 Cantrell ................ H04L 67/104
10,425,465 B1 * 9/2019 Jha .......................... H04L 67/53
2004/0162786 A1 * 8/2004 Cross ...................... G06F 21/33 705/59
2024/0320069 A1 * 9/2024 Tong .................. G06F 16/2433

FOREIGN PATENT DOCUMENTS

WO WO-2025172853 A1 * 8/2025 ............ H04W 12/37

* cited by examiner

*Primary Examiner* — Kendall Dolly

(57) ABSTRACT

In some implementations, an application programming interface (API) management platform may receive, from a user equipment (UE), a request to a unified application programming interface (API) proxy that supports multiple users with different certifications, different sets of registered endpoints, different API keys, and different authentication tokens, wherein the request is associated with a user of the multiple users. The API management platform may perform an evaluation of the request based on a comparison of information indicated in the request and information associated with the user, wherein the request is accepted based on a validation of the request or the request is blocked based on an invalidation of the request.

20 Claims, 9 Drawing Sheets

100

400

```xml
<?xml version="1.0" encoding="UTF-8" standalone="yes"?>
<KeyValueMapOperations async="false" continueOnError="false" enabled="true" name="KVM-2wayssl"
mapIdentifier="kvm-2wayssl">
  <DisplayName>KVM-2wayssl</DisplayName>
  <Properties/>
  <ExpiryTimeInSecs>500</ExpiryTimeInSecs>
  <Scope>environment</Scope>
  <Get assignTo="WhiteListCN" index="1">
    <Key>
      <Parameter ref="req.vendorName"/>
    </Key>
  </Get>
  <Get assignTo="CertStatus" index="2">
    <Key>
      <Parameter ref="req.vendorName"/>
    </Key>
  </Get>
  <InitialEntries>
    <Entry>
      <Key>
        <Parameter p="VendorName">vendor1</Parameter>
      </Key>
      <Value>vendor1-gw.com</Value>
      <Value>ok</Value>
    </Entry>
    <Entry>
      <Key>
        <Parameter p="VendorName">vendor2</Parameter>
      </Key>
      <Value>vendor2-gw.com</Value>
      <Value>ok</Value>
    </Entry>
  </InitialEntries>
</KeyValueMapOperations>
```

FIG. 4

500

```xml
<?xml version="1.0" encoding="UTF-8" standalone="yes"?>
<KeyValueMapOperations async="false" continueOnError="false" enabled="true" name="KVM-Allowed-endpoint"
mapIdentifier="kvm-allowed-endpoint">
  <DisplayName>KVMAllowedMethods-</DisplayName>
  <Properties/>
  <ExpiryTimeInSecs>300</ExpiryTimeInSecs>
  <Scope>environment</Scope>
  <Get assignTo="AllowedMethodList">
    <Key>
      <Parameter ref="req.vendorName"/>
    </Key>
  </Get>
  <InitialEntries>
    <Entry>
      <Key>
        <Parameter p="VendorName">vendor1</Parameter>
      </Key>
      <Value>GET/service1/actuator/health</Value>
      <Value>GET/service1/endpoint1</Value>
      <Value>GET/service2/actuator/health</Value>
      <Value>POST/service2/endpoint2</Value>
    </Entry>
    <Entry>
      <Key>
        <Parameter p="VendorName">vendor2</Parameter>
      </Key>
      <Value>GET/service1/actuator/health</Value>
      <Value>POST/service1/endPonit1</Value>
      <Value>GET/service1/endPonit1</Value>
      <Value>POST/service1/endPonit2</Value>
     <Value>POST/service2/endPonit1</Value>
      <Value>POST/service3/endPonit1</Value>
    </Entry>
  </InitialEntries>
</KeyValueMapOperations>
```

FIG. 5

SYSTEMS AND METHODS FOR PROVIDING A UNIFIED APPLICATION PROGRAMMING INTERFACE PROXY SUPPORTING MULTIPLE ENDPOINTS FOR MULTIPLE USERS

BACKGROUND

An application programming interface (API) management platform may be a platform for building, managing, and/or securing APIs. The API management platform may offer API proxies to create a consistent, reliable interface to a backend service. An API proxy may be associated with a layer in between the backend service and internal/external clients that want to use the backend service. The API management platform may provide an array of policies that allow security, traffic management, data mediation, and other features to be added to the API proxy.

BRIEF DESCRIPTION OF THE DRAWINGS

FIG. 4 is a diagram of an example associated with a key value map (KVM) for registered users.

FIG. 5 is a diagram of an example associated with a KVM for registered endpoints.

DETAILED DESCRIPTION OF EXAMPLE EMBODIMENTS

Figure 1:
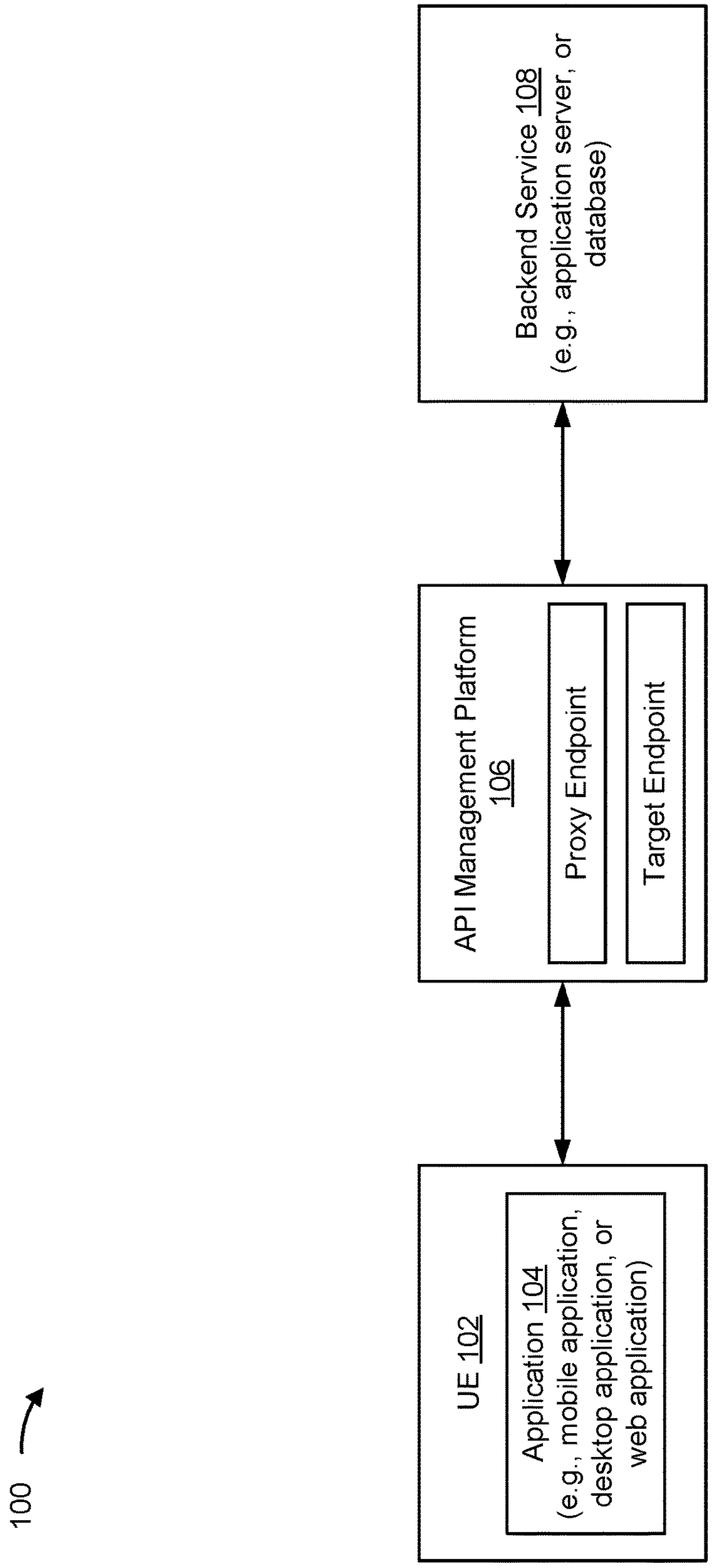
FIG. 1 is a diagram of an example associated with an API management platform.

The following detailed description of example implementations refers to the accompanying drawings. The same reference numbers in different drawings may identify the same or similar elements.

An API may be an interface that allows one application to consume capabilities or data from another application. By defining stable, simplified entry points to application logic and data, APIs may enable developers to easily access and reuse application logic built by other developers. Since applications that consume APIs may be sensitive to changes, APIs may provide a level of assurance that, over time, the APIs may only change in a predictable manner. An API proxy may decouple an application-facing API from a backend service, which may shield those applications from backend code changes. When backend changes are made to the backend service, applications may continue to call the same API without any interruption.

An API management platform may be a platform for building, managing, and/or securing APIs. The API management platform may offer API proxies to create a consistent, reliable interface to a backend service. The API management platform may provide the API proxy to provide granular control over security, rate limiting, quotas, and/or analytics. The API proxy may be associated with a layer in between the backend service and internal/external clients that want to use the backend service. The API management platform may provide an array of policies that allow security, traffic management, data mediation, and other features to be added to the API proxy. The API management platform may allow custom code, conditional logic, fault handling, rate limiting, caching, and/or other actions. Since policies and/or actions may be implemented on the API management platform, in the API proxy, the backend service may remain unchanged. The API management platform may be designed to aid API produces and API consumers. An API producer may build and manage an API that exposes their backend service. An API consumer may use data provided by the API in their client application.

In an API management platform, different API proxies may be defined for Internet facing users (vendors) with different client certifications, different authentication, and/or different authorization on endpoints. In existing API management platforms, e.g., APIGEE, a single API proxy may support only a single user, which may result in increased development, maintenance, and testing times since each proxy needs to be individually addressed. The existing API management platforms may require the creation of separate entry points for each client and/or certification, which may each require managing those entry points. The existing API management platforms may have such limitations. Such an approach may also result in increased infrastructure and computation resources needed, which may degrade an overall system performance.

In some implementations, in an API management platform, a unified (common) API proxy may be defined for Internet facing users with different client certifications, different authentication, and/or different authorization on endpoints. The unified API proxy may be built to support multiple users with different client certifications, different sets of registered endpoints, and/or different API keys and authentication tokens (e.g., open authentication (OAuth) 2.0 tokens). The API keys and authentication tokens may be derived from a consumer key/secret pair.

In some implementations, by using the unified API proxy, multiple users may be supported, which may save development, maintenance, and testing times. The unified API proxy may save infrastructure and computation resources. The unified API proxy may allow addition of support for new users, removal of support for existing users, addition of endpoints for existing users, and/or updating of endpoints for existing users. Further, the unified API proxy may reduce time needed to bring new changes to production.

FIG. 1 is a diagram of an example 100 associated with an API management platform. As shown in FIG. 1, example 100 includes a user equipment (UE) 102 that runs an application 104, an API management platform 106, and a backend service 108. The UE 102 may include a mobile device or a desktop computer. The application 104 may be a mobile application, a desktop application, a web application, or another type of application. The API management platform 106 may include an API proxy, where the API proxy may be associated with proxy endpoint(s) and target endpoint(s). The backend service 108 may include or be associated with an application server or a database.

As shown in FIG. 1, an organization may make their backend service 108 available on the web, such that the backend service 108 may be consumed by the application 104 running on the UE 102. The organization may expose the backend service 108 as a set of endpoints. The application 104 may make requests to these endpoints, and depending on the endpoint, the backend service 108 may return data back to the application 104. The API management platform 106 may be positioned between the UE 102 and the backend service 108. The API management platform 106 may provide secure access to the backend service 108 with a well-defined consistent API. Such an API may enable the application 104 to consume the backend service 108 and enable changes to a backend service implementation without affecting a public API. Rather than the application 104 consuming the backend service 108 directly, the application 104 may access an API proxy created by the API management platform 106. The API proxy may function as a mapping of a publicly available endpoint to the backend service 108. By creating the API proxy, the API management platform 106 may handle security and authorization tasks required to protect the backend service 108, as well as to analyze and monitor the backend service 108.

As indicated above, FIG. 1 is provided as an example. Other examples may differ from what is described with regard to FIG. 1.

Figure 2:
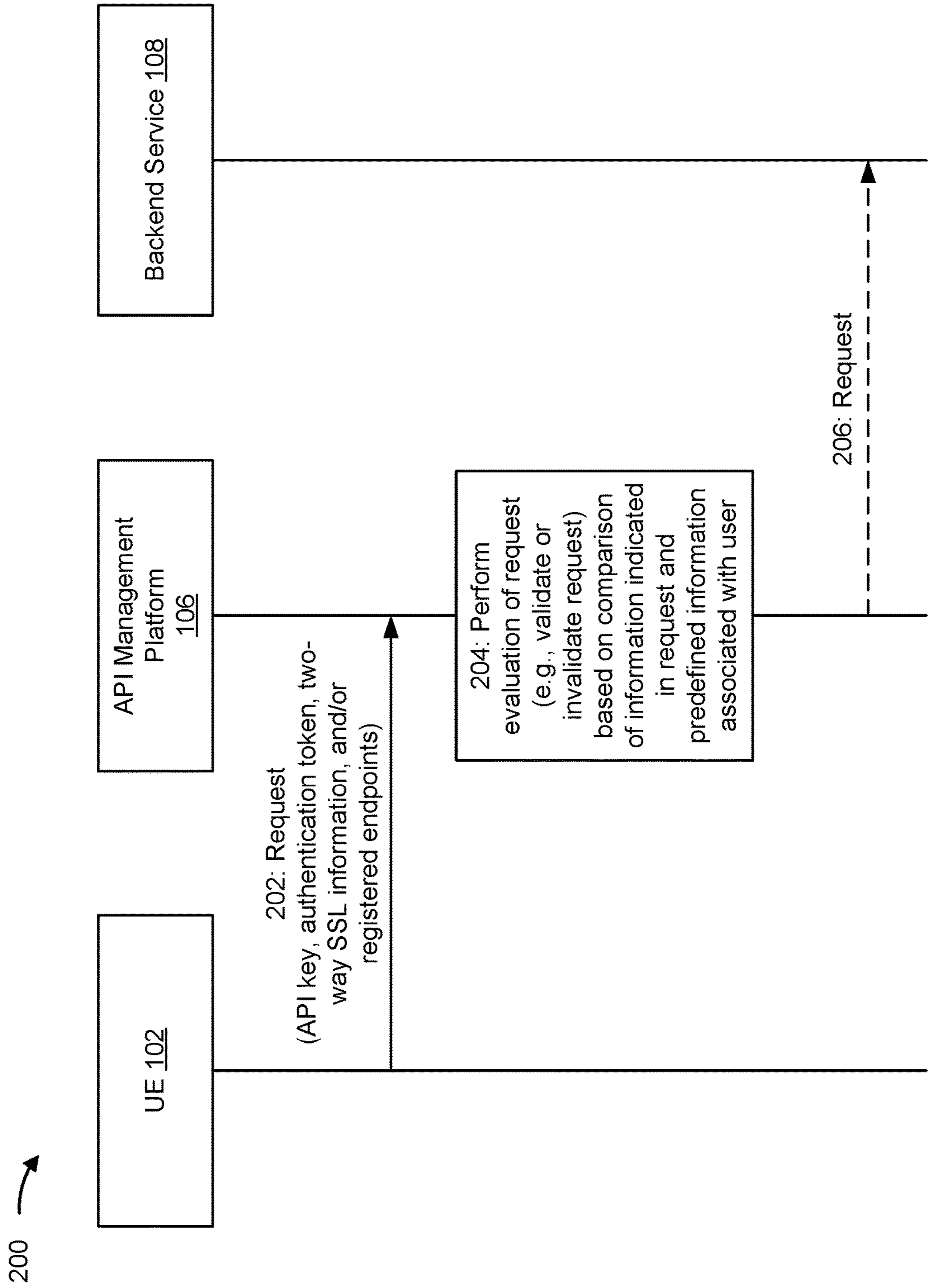
FIG. 2 is a diagram of an example associated with a unified API proxy that supports multiple endpoints for multiple users.

FIG. 2 is a diagram of an example 200 associated with a unified API proxy that supports multiple endpoints for multiple users. As shown in FIG. 2, example 200 includes a UE 102 that runs an application, an API management platform 106, and a backend service 108. The UE 102 may include a mobile device or a desktop computer. The application may be a mobile application, a desktop application, a web application, or another type of application. The API management platform 106 may include a unified API proxy. The backend service 108 may include or be associated with an application server or a database.

As shown by reference number 202, the API management platform 106 may receive, from the UE 102, a request to a unified API proxy that supports multiple endpoints for multiple users. The unified API proxy may simultaneously support multiple users with different certifications, different sets of registered endpoints, different API keys, and/or different authentication tokens. The request may be associated with a user of the multiple users. The request may be associated with a request uniform resource locator (URL) having a standardized URL pattern, and the request URL may indicate a domain name, a context path, a user name, an environment, a service name, and/or an endpoint.

As shown by reference number 204, the API management platform 106 may perform an evaluation of the request based on a comparison of information indicated in the request and information associated with the user. The API management platform 106 may validate the request or invalidate the request based on the comparison. The information associated with the user may be indicated in a KVM for registered users. The API management platform 106 may accept or allow the request based on a validation of the request. Alternatively, the API management platform 106 may block the request based on an invalidation of the request. In other words, the API management platform 106 may compare the information indicated in the request and the information associated with the user (e.g., information indicated in the KVM regarding the user), and based on the comparison, the API management platform 106 may either validate the request or invalidate the request. An allowed request may be provided to the backend service 108, whereas a blocked request may not be provided to the backend service 108. In some cases, the API management platform 106 may generate, based on the validation of the request, a target endpoint URL that is derived dynamically from the request URL, where the request URL may for the backend service 108.

In some implementations, the request may indicate an API key associated with the user or an authentication token associated with the user. The API management platform 106, when performing the evaluation, may validate the API key and/or the authentication token based on the comparison. Alternatively, the API management platform 106 may invalidate the API key and/or the authentication token based on the comparison. In some implementations, the request may include a header that indicates two-way secure socket layer (SSL) information associated with the user. The API management platform 106, when performing the evaluation, may validate the two-way SSL information based on the comparison. Alternatively, the API management platform 106 may invalidate the two-way SSL information based on the comparison. The two-way SSL information may indicate a common name (CN) whitelisted domain (WhiteList CN) associated with the user and a certification status (CertStatus) associated with the user. In some implementations, the request may indicate one or more registered endpoints associated with the user. Registered endpoint information may be taken from a URL associated with the request. The API management platform 106, when performing the evaluation, may validate the one or more registered endpoints based on the comparison. Alternatively, the API management platform 106 may invalidate the one or more registered endpoints based on the comparison.

In some implementations, in the API management platform 106, the unified API proxy may be developed to support the multiple users with different client certifications, different sets of registered endpoints, and/or different authentication tokens. In some implementations, the unified API proxy may be achieved by creating multiple API keys and authentication tokens. One API key and one authentication token may be created for each registered user. The API keys and the authentication tokens themselves may be different for registered users, but all of the API keys and the authentication tokens may be valid for the unified API proxy. A plurality of users (e.g., all users) with a unique set of API keys and authentication tokens may pass an API key validation and an authentication token validation of the unified API proxy.

In some implementations, the unified API proxy may be achieved by standardizing a URL pattern with a user name in a path immediately after a context path, followed by a service name and an endpoint name. The URL pattern may be standardized in accordance with https://<domain>/<contextpath>/<vendor-name>/<environment>/<serviceName>/<endpoint>. The URL pattern may be standardized for a request URL. As an example, a request URL for a user name of "15gifts", a service name of "customer profile", and an endpoint name of "customer" may be "https://<domain>/apis/vendors/15gifts/customerProfile/customer" in accordance with the URL pattern, where "/apis/vendors/" may be the context path.

Figure 3:
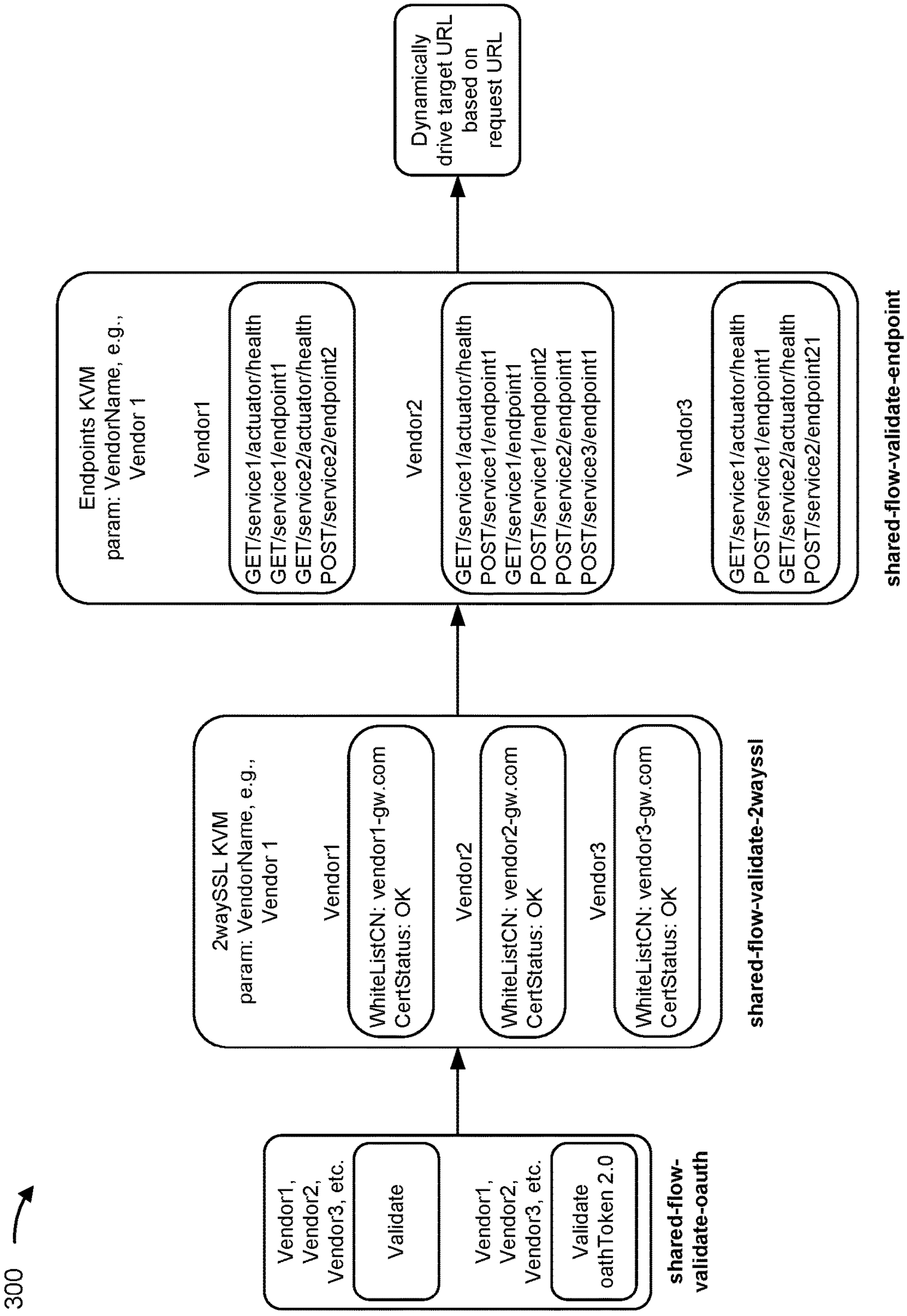
FIG. 3 is a diagram of an example associated with a sequence of shared flows for achieving a unified API proxy.

In some implementations, the unified API proxy may be achieved by using a sequence of multiple shared flows. A first shared flow may be associated with an authentication validation (shared-flow-validate-oauth). A second shared flow may be associated with a two-way SSL validation (shared-flow-validate-2wayssl). A third shared flow may be associated with an endpoint validation (shared-flow-validate-endpoint). Based on the user name, the service name, and the endpoint name, the two-way SSL validation and the endpoint validation may be performed and a target URL may be generated. After all of the shared flows validate a request successfully, a target endpoint URL may be dynamically derived from the request URL for underlying services. An example of the first shared flow, the second shared flow, and the third shared flow is shown in FIG. 3.

In some implementations, the first shared flow may serve to validate API keys and authentication tokens of registered users. A request with an invalid API key or an invalid authentication token may be blocked.

In some implementations, the second shared flow may include a KVM, where one section of the KVM may be for each registered user. When no entry is present for a user in the KVM, that user may not be registered. Each registered user's section may indicate a WhiteList CN and a CertStatus. A KVM for a registered user may be based on a particular structure (e.g., as shown in FIG. 4). The KVM may take a required user (vendor) name (req.vendorName) input parameter, which may be derived from the user (vendor) name in the request URL. The KVM may save certification information in environment variables for each user, where the environment variables may include WhiteList CN and CertStatus. Any unregistered user may be blocked.

In some implementations, a CN attribute from a header (e.g., header X=SUBJECT-NAME) may be compared with the WhiteList CN indicated in the KVM for the corresponding user. The two-way SSL validation may be completed when the CN attribute matches with the WhiteList CN indicated in the KVM. Further, a CertStatus from a header (e.g., header X-CLIENT-CERT-STATUS) may be compared with the CertStatus indicated in the KVM for the corresponding user. The two-way SSL validation may be completed when the CertStatus from the header matches with the CertStatus indicated in the KVM. A single API proxy using the second shared flow may handle two-way SSL validation for each registered user.

In some implementations, the third shared flow may allow only registered endpoints for corresponding users. Endpoint registration may be achieved using a KVM for registered endpoints (e.g., as shown in FIG. 5). The KVM may include one section for each user, such that the single API proxy may be allowed to use the third shared flow to validate endpoints for multiple users. One registered user may be associated with multiple services. Each service of the multiple services may be associated with multiple endpoints. Requests with an unregistered endpoint in the KVM for the user may be blocked, thereby only allowing requests with registered endpoints.

As shown by reference number 206, the API management platform 106 may transmit, to the backend service 108, the request based on a validation of the request. The API management platform 106 may transmit the request to the backend service 108 when the request is accepted or allowed. The API management platform 106 may not transmit the request to the backend service 108 when the request is invalidated. In some implementations, the API management platform 106 may receive, from the backend service 108, a response. The response may be based on the request. The API management platform 106 may forward the response to the UE 102. Thus, communications between the UE 102 and the backend service 108 may be processed by the API management platform 106.

In some implementations, by implementing the unified API proxy for the multiple users, instead of having separate API proxies for separate users, infrastructure and computation resources may be saved. Further, by using the unified API proxy, users may added and/or removed with less overhead, which may reduce time needed to bring new changes to production.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIG. 3 is a diagram of an example 300 associated with a sequence of shared flows for achieving a unified API proxy.

As shown in FIG. 3, in a first shared flow associated with an authentication validation (shared-flow-validate-oauth), for each user (e.g., Vendor1, Vendor2, and so on), an API key and an authentication token may be validated. In a second shared flow associated with a two-way SSL validation (shared-flow-validate-2wayssl), for each user, a WhiteList CN and a CertStatus (e.g., OK) may be defined. In a third shared flow associated with an endpoint validation (shared-flow-validate-endpoint), for each user, multiple services and/or multiple endpoints may be defined. The user may be authorized to call certain endpoints.

As indicated above, FIG. 3 is provided as an example. Other examples may differ from what is described with regard to FIG. 3.

FIG. 4 is a diagram of an example 400 associated with a KVM for registered users.

As shown in FIG. 4, the KVM may include one section for each registered user. The KVM may take a required user name (req.vendorName) input parameter, which may be derived from the user name in the request URL. The KVM may save certification information in environment variables for each user, where the environment variables may include WhiteList CN and CertStatus.

As indicated above, FIG. 4 is provided as an example. Other examples may differ from what is described with regard to FIG. 4.

FIG. 5 is a diagram of an example 500 associated with a KVM for registered endpoints.

As shown in FIG. 5, the KVM may include one section for each registered user. The KVM may indicate, for each user, one or more services. Each service may be associated with multiple endpoints. The KVM may be used to validate endpoints for multiple users.

As indicated above, FIG. 5 is provided as an example. Other examples may differ from what is described with regard to FIG. 5.

In some implementations, the first shared flow may block a request which does not have a valid API key and/or a valid authentication token. The second shared flow may block a request which does not have matching two-way SSL information of a user. The third shared flow may block a request which does not have a matching endpoint for the user. The first shared flow, the second shared flow, and the third shared flow may work together in a single unified API proxy in order to block an unauthenticated, unauthorized, and/or unregistered request.

In some implementations, a request with an invalid API key and an invalid authentication token may be blocked. In some implementations, a request with a valid API key but for an unregistered user may be blocked. In some implementations, a request with a valid API key for a registered user but with invalid two-way SSL information may be blocked. In some implementations, a request with a valid API key for a registered user and with valid two-way SSL information but with an unregistered endpoint may be blocked.

In some implementations, a first user may call an endpoint registered for a second user using a URL of "https://<domain>//apis/vendors/vendor2/service3/endpoint1". The first user may be able to pass through the first shared flow because a request from the first user may have a valid API key and a valid authentication token, but the request may be blocked during the second shared flow because two-way SSL information associated with the first user may not be the same as two-way SSL information associated with the second user (e.g., a certificate of the first user does not match a certificate of the second user).

In some implementations, a first user may call an endpoint registered for a second user using a URL of "https://<domain>//apis/vendors/vendor1/service3/endpoint1". In this case, the request may be blocked during the third shared flow because a service3/endpoint1 may not be registered as an endpoint of the first user. In other words, the first user may not be authorized to call service 3/endpoint1. In some implementations, a request with a valid API key for a registered user and with valid two-way SSL information and with a registered endpoint may be allowed. In some implementations, when the request is accepted, the registered endpoint may then make a request to a backend service using information from the request.

Figure 6:
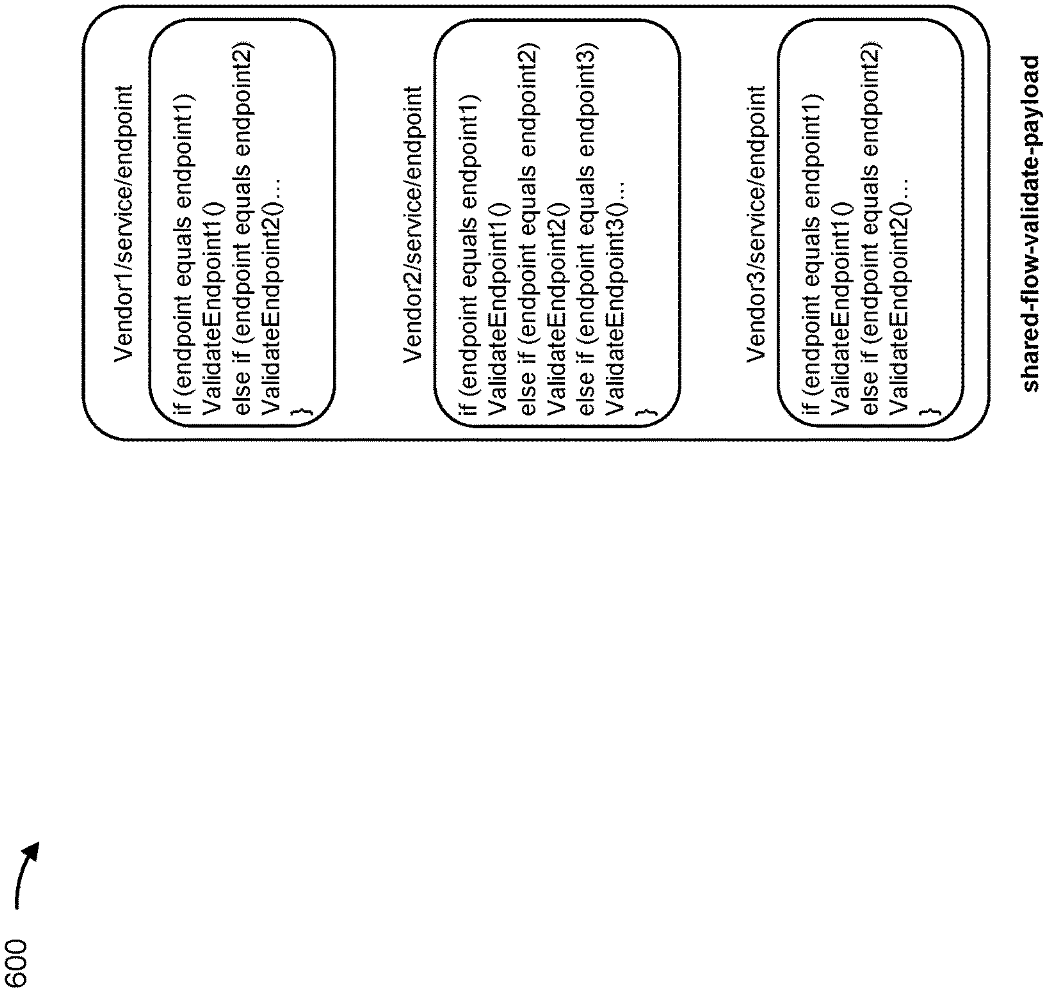
FIG. 6 is a diagram of an example associated with a shared flow associated with a payload validation.

FIG. 6 is a diagram of an example 600 associated with a shared flow associated with a payload validation.

As shown in FIG. 6, a validation may be extended for a request payload for endpoints of a user by introducing a shared flow, such as a shared flow associated with a payload validation. Such a shared flow may be a fourth shared flow, and may follow a first shared flow, a second shared flow, and a third shared flow as described herein. For example, a plurality of endpoints may be validated for a first user, a plurality of endpoints may be validated for a second user, and so on.

As indicated above, FIG. 6 is provided as an example. Other examples may differ from what is described with regard to FIG. 6.

Figure 7:
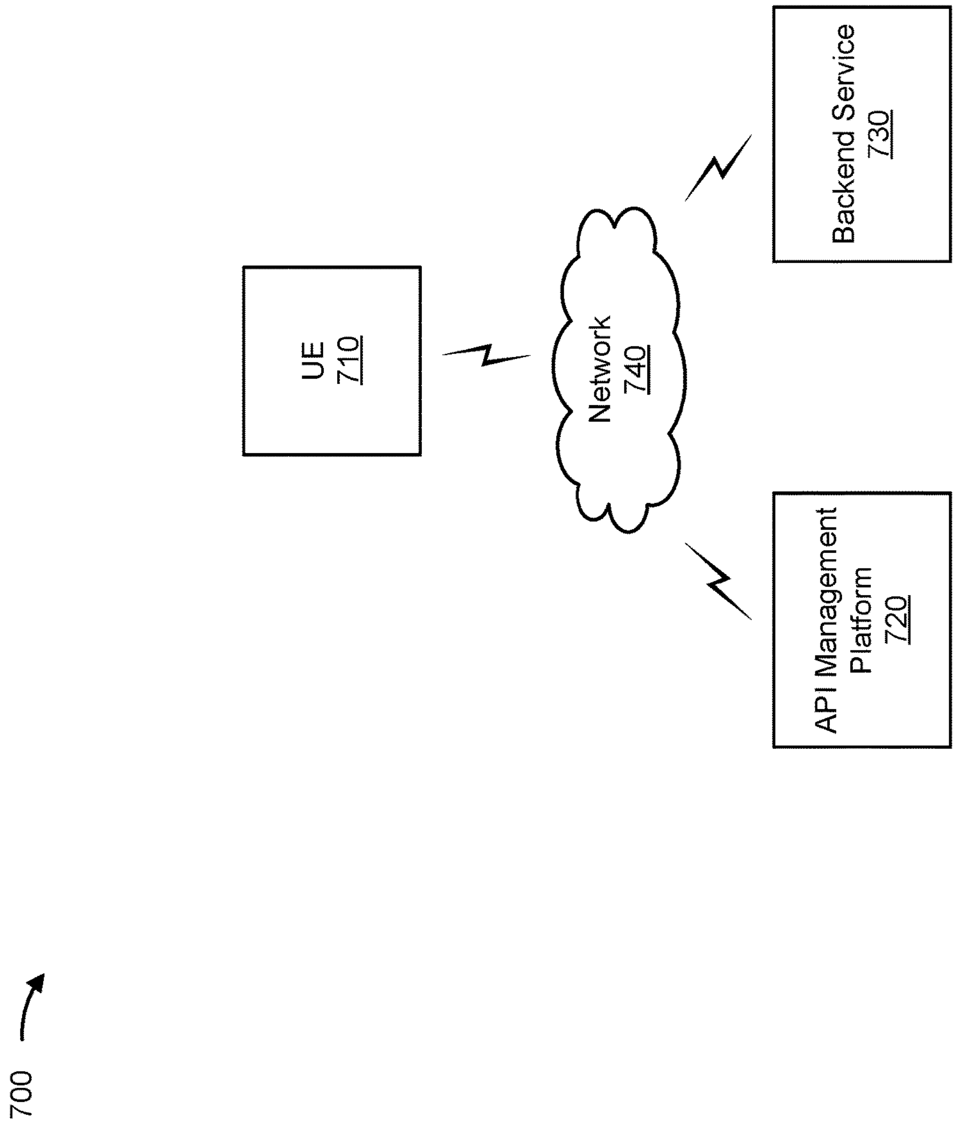
FIG. 7 is a diagram of an example environment in which systems and/or methods described herein may be implemented.

FIG. 7 is a diagram of an example environment 700 in which systems and/or methods described herein may be implemented. As shown in FIG. 7, environment 700 may include a UE 710, an API management platform 720, a backend service 730, and a network 740. Devices of environment 700 may interconnect via wired connections, wireless connections, or a combination of wired and wireless connections.

The UE 710 may include one or more devices capable of receiving, generating, storing, processing, and/or providing information associated with providing a unified API proxy that supports multiple endpoints for multiple users, as described elsewhere herein. The UE 710 may include a communication device and/or a computing device. For example, the UE 710 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The API management platform 720 may include one or more devices capable of receiving, generating, storing, processing, providing, and/or routing information associated with providing a unified API proxy that supports multiple endpoints for multiple users, as described elsewhere herein. The API management platform 720 may include a communication device and/or a computing device. For example, the API management platform 720 may include a server, such as an application server, a client server, a web server, a database server, a host server, a proxy server, a virtual server (e.g., executing on computing hardware), or a server in a cloud computing system. In some implementations, the API management platform 720 may include computing hardware used in a cloud computing environment.

The backend service 730 may include one or more devices capable of receiving, generating, storing, processing, providing, and/or routing information associated with providing a unified API proxy that supports multiple endpoints for multiple users, as described elsewhere herein. The backend service 730 may include a communication device and/or a computing device. For example, the backend service 730 may include a server, such as an application server, a client server, a web server, a database server, a host server, a proxy server, a virtual server (e.g., executing on computing hardware), or a server in a cloud computing system. In some implementations, the backend service 730 may include computing hardware used in a cloud computing environment.

The network 740 may include one or more wired and/or wireless networks. For example, the network 740 may include a cellular network (e.g., a Fifth Generation (5G) network, a Fourth Generation (4G) network, a Long Term Evolution (LTE) network, a Third Generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 740 may enable communication among the one or more devices of environment 700.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
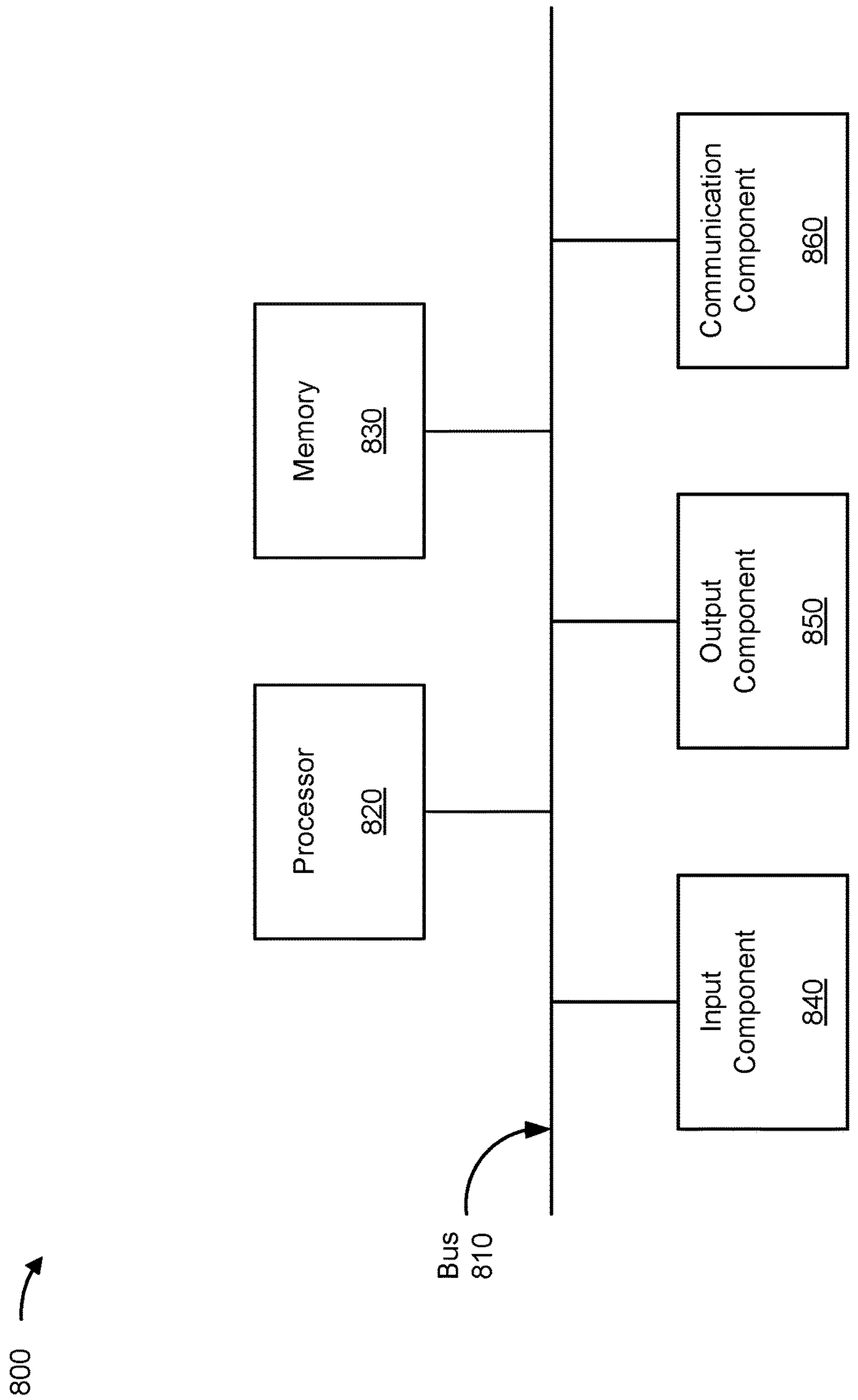
FIG. 8 is a diagram of example components of one or more devices of FIG. 7.

FIG. 8 is a diagram of example components of a device 800 associated with a unified API proxy that supports multiple endpoints for multiple users. The device 800 may correspond to an API management platform (e.g., API management platform 106). In some implementations, the network node may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

Figure 9:
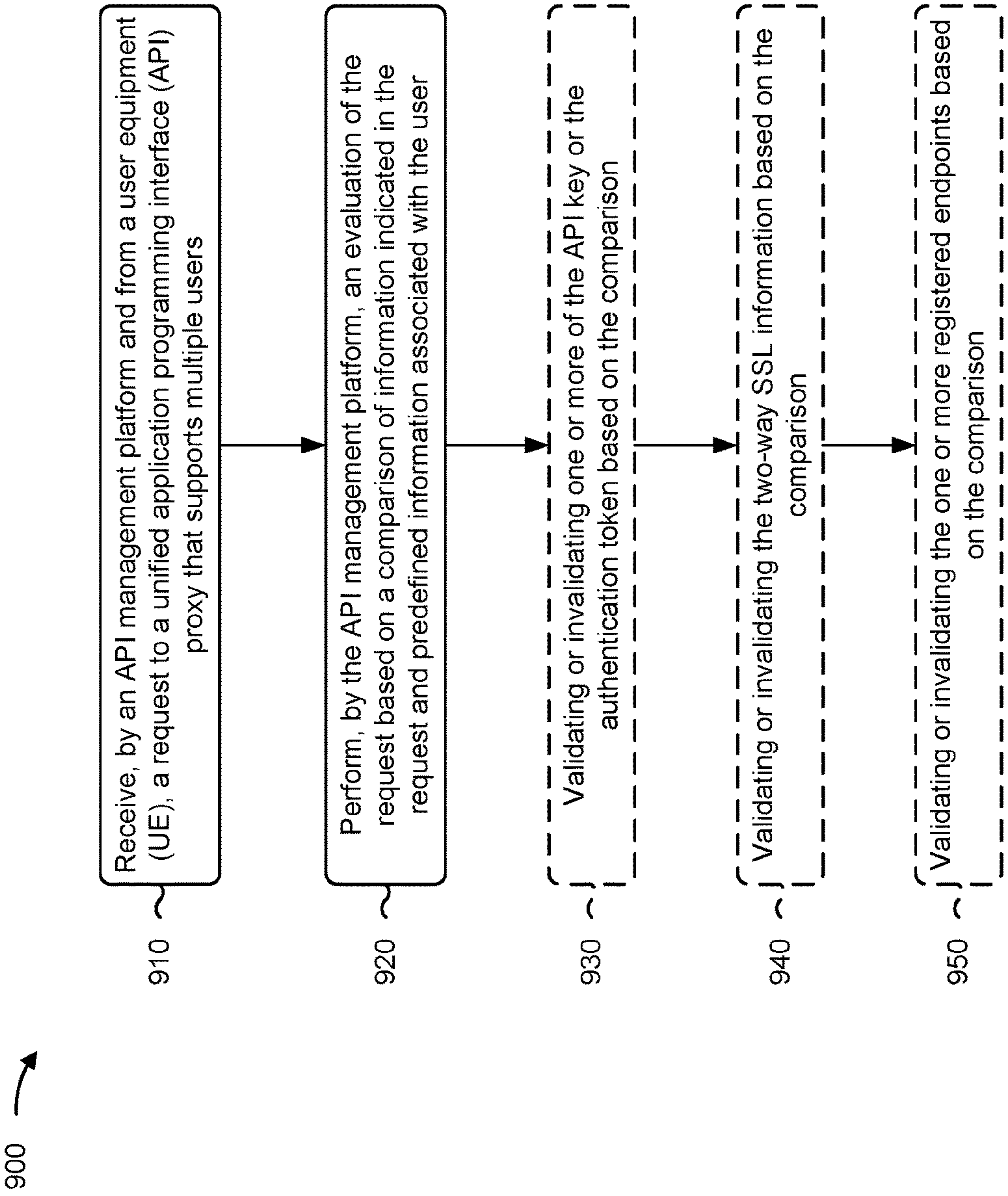
FIG. 9 is a flowchart of an example process associated with a unified API proxy that supports multiple endpoints for multiple users.

FIG. 9 is a flowchart of an example process 900 associated with a unified API proxy that supports multiple endpoints for multiple users. In some implementations, one or more process blocks of FIG. 9 may be performed by an API management platform (e.g., API management platform 106). Additionally, or alternatively, one or more process blocks of FIG. 9 may be performed by one or more components of device 800, such as processor 820, memory 830, input component 840, output component 850, and/or communication component 860.

As shown in FIG. 9, process 900 may include receiving, from a UE, a request to a unified API proxy that supports multiple endpoints for multiple users (block 910). The request may be associated with a user of the multiple users. The unified API proxy may be associated with an API management platform that simultaneously supports multiple users with different certifications, different sets of registered endpoints, different API keys, and different authentication tokens. The request may be associated with a request URL having a standardized URL pattern, and the request URL may indicate a domain name, a context path, a user name, an environment, a service name, and/or an endpoint.

As shown in FIG. 9, process 900 may include performing an evaluation of the request based on a comparison of information indicated in the request and information associated with the user (block 920). The information associated with the user may be indicated in a KVM for registered users. The request may be allowed based on a validation of the request or the request may be blocked based on an invalidation of the request. For example, the request may indicate an API key, an authentication token, two-way SSL information, and/or one or more registered endpoints associated with the user, and the API key, the authentication token, the two-way SSL information, and/or the one or more registered endpoints may be validated or invalidated based on the comparison. A target endpoint URL may be generated from the request URL based on the validation of the request, where the request URL may be for a backend service.

As shown in FIG. 9, process 900 may include, when performing the evaluation of the request, validating one or more of the API key or the authentication token based on the comparison (block 930). Alternatively, process 900 may include, when performing the evaluation of the request, invalidating one or more of the API key or the authentication token based on the comparison. As shown in FIG. 9, process 900 may include, when performing the evaluation of the request, validating the two-way SSL information based on the comparison (block 940). Alternatively, process 900 may include, when performing the evaluation of the request, invalidating the two-way SSL information based on the comparison. As shown in FIG. 9, process 900 may include, when performing the evaluation of the request, validating the one or more registered endpoints based on the comparison (block 950). Alternatively, process 900 may include, when performing the evaluation of the request, invalidating the one or more registered endpoints based on the comparison.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by an application programming interface (API) management platform and from a user equipment (UE), a request to a unified API proxy that supports multiple users with different certifications, different sets of registered endpoints, different API keys, and different authentication tokens, wherein the request is associated with a user of the multiple users, wherein the request indicates two-way secure socket layer (SSL) information associated with the user, and wherein the two-way SSL information indicates a common name whitelisted domain associated with the user and a certification status associated with the user; and performing, by the API management platform, an evaluation of the request based on a comparison of information indicated in the request and information associated with the user, wherein the request is accepted based on a validation of the request or the request is blocked based on an invalidation of the request.

2. The method of claim 1, wherein the unified API proxy is a single API proxy that simultaneously supports multiple internet facing users.

3. The method of claim 1, wherein the request is associated with a request uniform resource locator (URL) having a standardized URL pattern, and the request URL indicates one or more of: a domain name, a context path, a user name, an environment, a service name, or an endpoint.

4. The method of claim 3, further comprising:
generating, based on the validation of the request, a target endpoint URL that is derived from the request URL, wherein the request URL is for a backend service.

5. The method of claim 1, wherein the request indicates one or more of an API key associated with the user or an authentication token associated with the user, and performing the evaluation of the request comprises:
validating one or more of the API key or the authentication token based on the comparison; or
invalidating one or more of the API key or the authentication token based on the comparison.

6. The method of claim 1, wherein the request includes a header that indicates the two-way SSL information associated with the user, and performing the evaluation of the request comprises:
validating the two-way SSL information based on the comparison; or
invalidating the two-way SSL information based on the comparison.

7. The method of claim 1, wherein the request indicates one or more registered endpoints associated with the user, and performing the evaluation of the request comprises:
validating the one or more registered endpoints based on the comparison; or
invalidating the one or more registered endpoints based on the comparison.

8. The method of claim 1, wherein the information associated with the user is indicated in a key value map (KVM) for registered users.

9. A device, comprising:
one or more processors configured to:
receive, from a user equipment (UE), a request to a unified application programming interface (API) proxy that supports multiple users with different certifications, different sets of registered endpoints, different API keys, and different authentication tokens, wherein the request is associated with a user of the multiple users, wherein the request indicates two-way secure socket layer (SSL) information associated with the user, and wherein the two-way SSL information indicates a common name whitelisted domain associated with the user and a certification status associated with the user;
validate the request based on a comparison of information indicated in the request and information associated with the user; and
transmit, to a backend service, the request based on a validation of the request.

10. The device of claim 9, wherein the unified API proxy is a single API proxy that simultaneously supports multiple internet facing users.

11. The device of claim 9, wherein the request is associated with a request uniform resource locator (URL) having a standardized URL pattern, and the request URL indicates one or more of: a domain name, a context path, a user name, an environment, a service name, or an endpoint.

12. The device of claim 11, wherein the one or more processors are further configured to:
generate, based on the validation of the request, a target endpoint URL that is derived from the request URL, wherein the request URL is for the backend service.

13. The device of claim 9, wherein the request indicates one or more of an API key associated with the user or an authentication token associated with the user, and one or more of the API key or the authentication token is validated based on the comparison.

14. The device of claim 9, wherein the request includes a header that indicates the two-way SSL information associated with the user, the two-way SSL information is validated based on the comparison.

15. The device of claim 9, wherein the request indicates one or more registered endpoints associated with the user, and the one or more registered endpoints are validated based on the comparison.

16. A non-transitory computer-readable medium storing a set of instructions, the set of instructions comprising:
one or more instructions that, when executed by one or more processors of a device, cause the device to:
receive, from a user equipment (UE), a request to a unified application programming interface (API) proxy that supports multiple users with different certifications, different sets of registered endpoints, different API keys, and different authentication tokens, wherein the request is associated with a user of the multiple users, wherein the request indicates two-way secure socket layer (SSL) information associated with the user, and wherein the two-way SSL information indicates a common name whitelisted domain associated with the user and a certification status associated with the user; and
validate or invalidate the request based on a comparison of information indicated in the request and information associated with the user, wherein the request is accepted based on a validation of the request or the request is blocked based on an invalidation of the request.

17. The non-transitory computer-readable medium of claim 16, wherein the unified API proxy is a single API proxy that simultaneously supports multiple internet facing users.

18. The non-transitory computer-readable medium of claim 16, wherein the request is associated with a request uniform resource locator (URL) having a standardized URL pattern, and the request URL indicates one or more of: a domain name, a context path, a user name, an environment, a service name, or an endpoint.

19. The non-transitory computer-readable medium of claim 18, wherein the one or more instructions, when executed by the one or more processors, further cause the device to:
generate, based on the validation of the request, a target endpoint URL that is derived from the request URL, wherein the request URL is for a backend service.

20. The non-transitory computer-readable medium of claim 16, wherein the request indicates one or more of an API key associated with the user, an authentication token associated with the user, or one or more registered endpoints associated with the user, and the one or more instructions, when executed by the one or more processors, further cause the device to:
validate or invalidate one or more of the API key, the authentication token, the two-way SSL information, or the one or more registered endpoints based on the comparison.

* * * * *